(12) United States Patent
Zhou (10) Patent No.: US 11,835,650 B2
(45) Date of Patent: Dec. 5, 2023

(54) LASER RECEIVING CIRCUIT AND LIDAR WHEREIN THE REVERSE DC VOLTAGE SIGNALS FROM A DC BIAS CIRCUIT AND THE AC VOLTAGE SIGNALS FROM AN AMPLIFIER CIRCUIT ARE SUPERIMPOSED

(71) Applicant: SUTENG INNOVATION TECHNOLOGY CO., LTD., Shenzhen (CN)

(72) Inventor: Xiaojun Zhou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/094,347

(22) Filed: Jan. 7, 2023

(65) Prior Publication Data
US 2023/0168344 A1 Jun. 1, 2023

Related U.S. Application Data

(63) Continuation of application No. PCT/CN2020/101371, filed on Jul. 10, 2020.

(51) Int. Cl.
*G01S 7/48* (2006.01)

(52) U.S. Cl.
CPC ..................... *G01S 7/48* (2013.01)

(58) Field of Classification Search
CPC ........ G01R 31/50; G01R 31/52; G01R 31/54; G01S 17/02; G01S 7/48; H03M 1/12
USPC .......................................... 250/214 R, 214 A
See application file for complete search history.

(56) References Cited

U.S. PATENT DOCUMENTS 11,598,821 B2 * 3/2023 Jørgensen ................ H04R 3/04

FOREIGN PATENT DOCUMENTS

| CN | 103326735 A | 9/2013 |
| CN | 103856051 A | 6/2014 |
| CN | 105496359 A | 4/2016 |
| CN | 206301230 U | 7/2017 |
| CN | 109613339 A | 4/2019 |
| CN | 210403192 U | 4/2020 |
| CN | 210745091 U | 6/2020 |
| WO | 2019089394 A1 | 5/2019 |

OTHER PUBLICATIONS

International Search Report issued in corresponding International Application No. PCT/CN2020/101371, dated Apr. 22, 2021, 8 pages.

* cited by examiner

*Primary Examiner* — Que Tan Le
(74) *Attorney, Agent, or Firm* — BAYES PLLC (57) ABSTRACT

The present application discloses a laser receiving circuit and a LiDAR. The laser receiving circuit includes an amplifying circuit, a DC bias circuit, and an analog-to-digital converter. The amplifying circuit is connected to the analog-to-digital converter and configured to amplify input first voltage signals to obtain second voltage signals, and the second voltage signals are AC voltage signals. The DC bias circuit is connected to the analog-to-digital converter and configured to generate reverse DC voltage signals, and the reverse DC voltage signals and the second voltage signals are superimposed to obtain third voltage signals. The analog-to-digital converter is configured to sample the third voltage signals.

9 Claims, 9 Drawing Sheets

LASER RECEIVING CIRCUIT AND LIDAR WHEREIN THE REVERSE DC VOLTAGE SIGNALS FROM A DC BIAS CIRCUIT AND THE AC VOLTAGE SIGNALS FROM AN AMPLIFIER CIRCUIT ARE SUPERIMPOSED

CROSS-REFERENCE TO RELATED APPLICATION

The present application is a continuation of International Application No. PCT/CN2020/101371, filed on Jul. 10, 2020, the content of which is incorporated herein by reference in its entirety.

TECHNICAL FIELD

The present application relates to the field of circuits, and in particular, to a laser receiving circuit and a LiDAR.

BACKGROUND

In LiDAR, a laser receiving circuit is configured to receive echo laser signals formed by the reflection of a target object. The laser receiving circuit mainly includes a receiving sensor, a TIA (trans-impedance amplifier), an amplifying circuit, an ADC (analog-to-digital converter), and a controller. The main working process of the laser receiving circuit includes: the receiving sensor receives the echo laser signals, and photoelectrically converts the echo laser signals to obtain current signals; the TIA converts the current signals into voltage signals; the amplifying circuit amplifies the voltage signals and sends the amplified voltage signals to the ADC; the ADC samples the amplified voltage signals to obtain the sampled signals, and transmits the sampled signals to the controller for processing. In the laser receiving circuit, the ADC usually adopts high-speed differential input. A coupling mode of an input port is generally an AC coupling mode. An input dynamic range of the ADC affects a ranging performance.

SUMMARY

An embodiment of the present application provides a laser receiving circuit and a LiDAR, which can solve a problem of a decrease in a received signal-to-noise ratio caused by an insufficient actual input dynamic range of an analog-to-digital converter.

In a first aspect, an embodiment of the present application provides a laser receiving circuit, including:

an amplifying circuit, connected to an analog-to-digital converter and configured to amplify input first voltage signals to obtain second voltage signals; where the second voltage signals are AC voltage signals;

a DC bias circuit, connected to the analog-to-digital converter and configured to generate reverse DC voltage signals; where the reverse DC voltage signals and the second voltage signals are superimposed to obtain third voltage signals; and the analog-to-digital converter, configured to sample the third voltage signals.

In a second aspect, an embodiment of the present application provides a LiDAR, including the foregoing laser receiving circuit.

The beneficial effects provided by the technical solutions of some embodiments of this application include at least the following.

The DC bias circuit is added to the laser receiving circuit. The DC bias circuit loads the reverse DC voltage signals on an input port of the analog-to-digital converter to move a baseline of input voltage signals of the analog-to-digital converter down, which can increase an input dynamic range of the analog-to-digital converter, and increase a gain of a previous-step amplifying circuit, thereby improving a signal-to-noise ratio of the laser receiving circuit and increasing a ranging performance.

BRIEF DESCRIPTION OF DRAWINGS

To explain embodiments of this application or the technical solutions in the prior art more clearly, the following briefly introduces the drawings used in the embodiments or the prior art. The drawings in the following description are only some embodiments of the present application. The person skilled in the art may obtain other drawings based on these drawings without inventive labor.

DETAILED DESCRIPTION

To make objectives, technical solutions, and advantages of the present application clearer, embodiments of the present application are described in further detail below with reference to the drawings.

Figure 1:
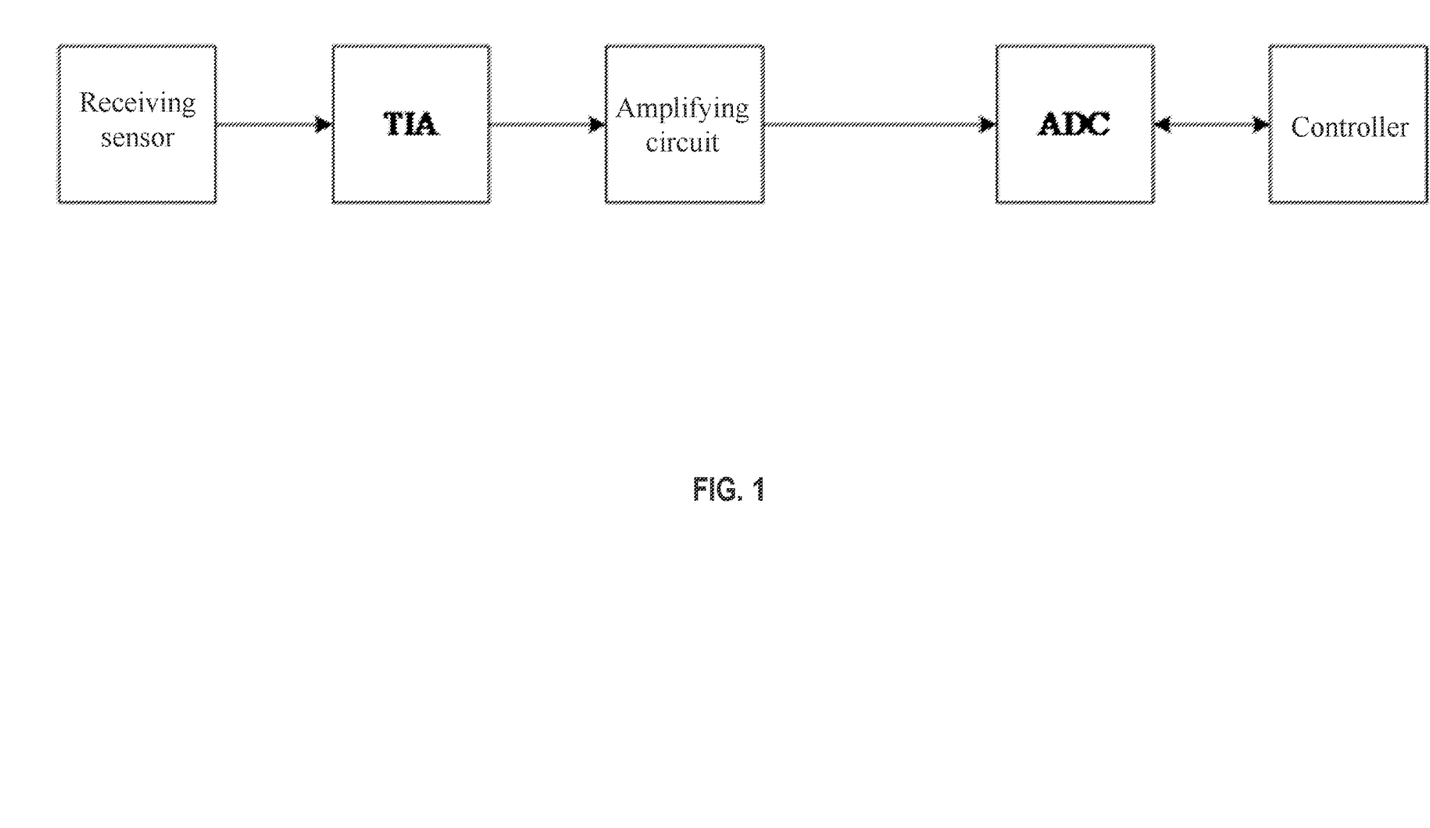
FIG. 1 is a schematic structural diagram of a laser receiving circuit in the related art according to an embodiment of the present application.

FIG. 1 shows a schematic structural diagram of a laser receiving circuit. The laser receiving circuit includes a receiving sensor, a TIA, an amplifying circuit, an ADC, and a controller. The receiving sensor receives the echo laser signals, and photoelectrically converts the echo laser signals to obtain current signals. The TIA converts the current signals into voltage signals. The amplifying circuit amplifies the voltage signals and sends the amplified voltage signals to the ADC. The ADC samples the amplified voltage signals to obtain the sampled signals, and transmits the sampled signals to the controller for processing.

Figure 2:
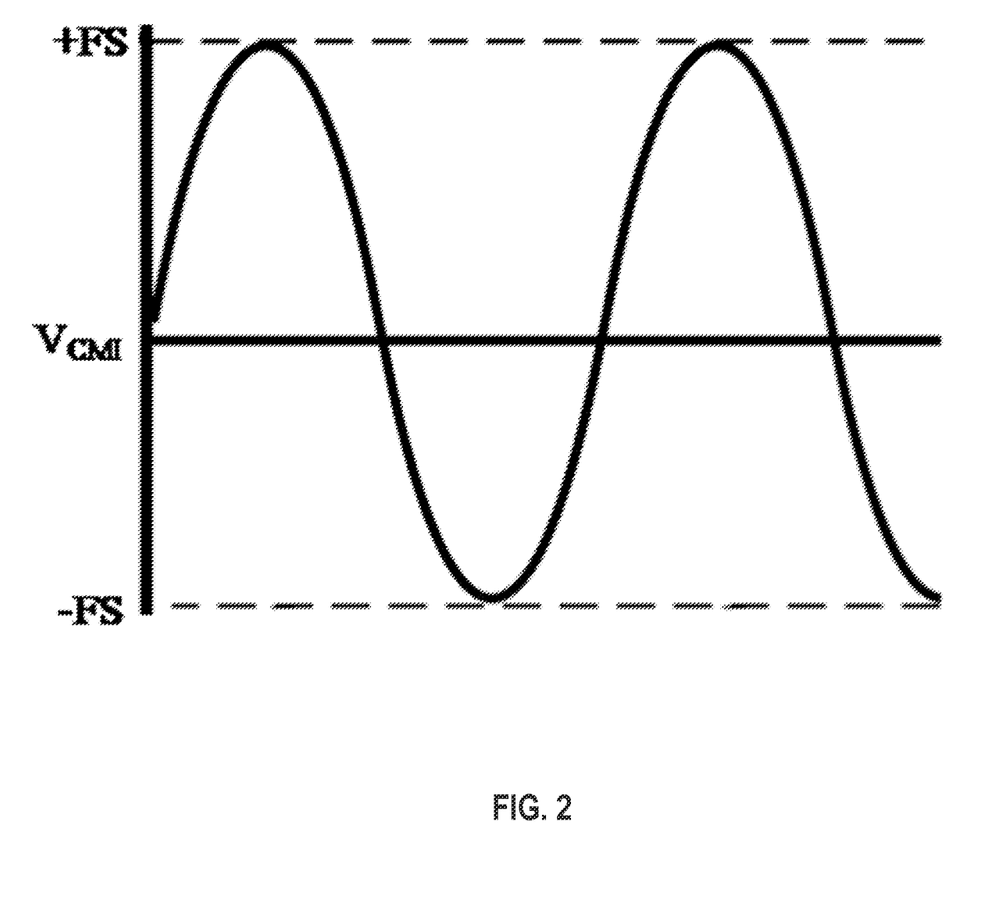
FIG. 2 is a schematic diagram of an input dynamic range supported by an analog-to-digital converter.
Figure 3:
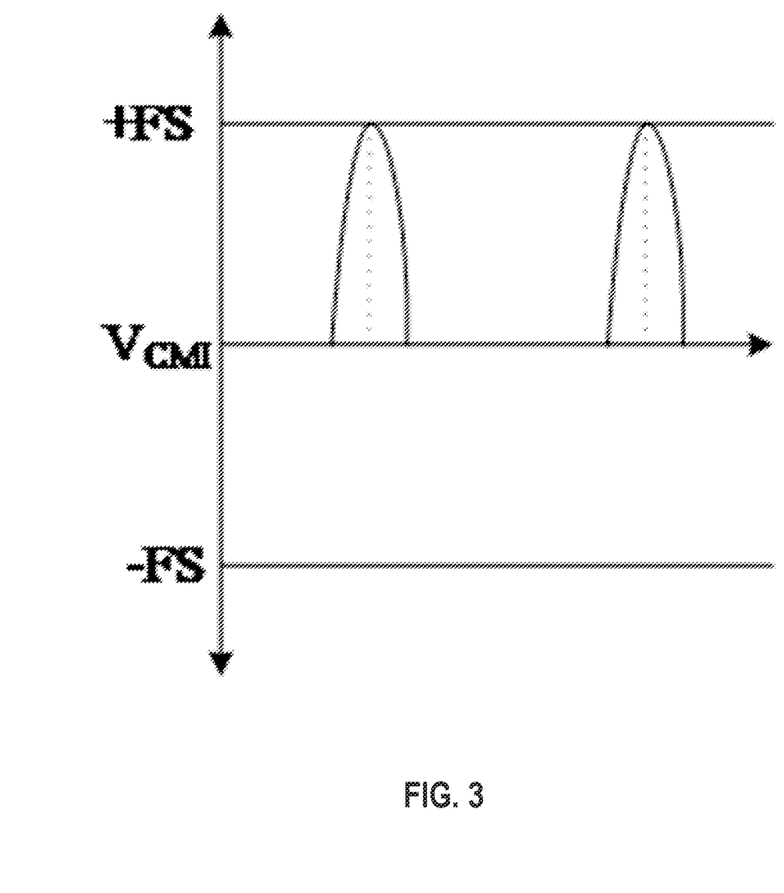
FIG. 3 is a schematic diagram of an actual input dynamic range of an analog-to-digital converter.

As shown in FIG. 2, an input dynamic range supported by the ADC is −FS~+FS, and the input dynamic range is an inherent parameter value of the ADC. The voltage signals output by the TIA are forward voltage signals. After being amplified by the amplifying circuit, the voltage signals input to the ADC are also forward voltage signals. The ADC uses a fully differential input mode. Reference input common-mode voltage signals VCMI can be provided by the ADC itself and can also be provided by an external circuit. Therefore, the ADC has an actual input voltage range between VCMI~+FS as shown in FIG. 3. The ADC has an actual input dynamic range equivalent to only half of the input voltage range supported by the ADC. A decrease in the actual input dynamic range of the ADC reduces a signal-to-noise ratio of the laser receiving circuit, resulting in a poor ranging performance.

Figure 4:
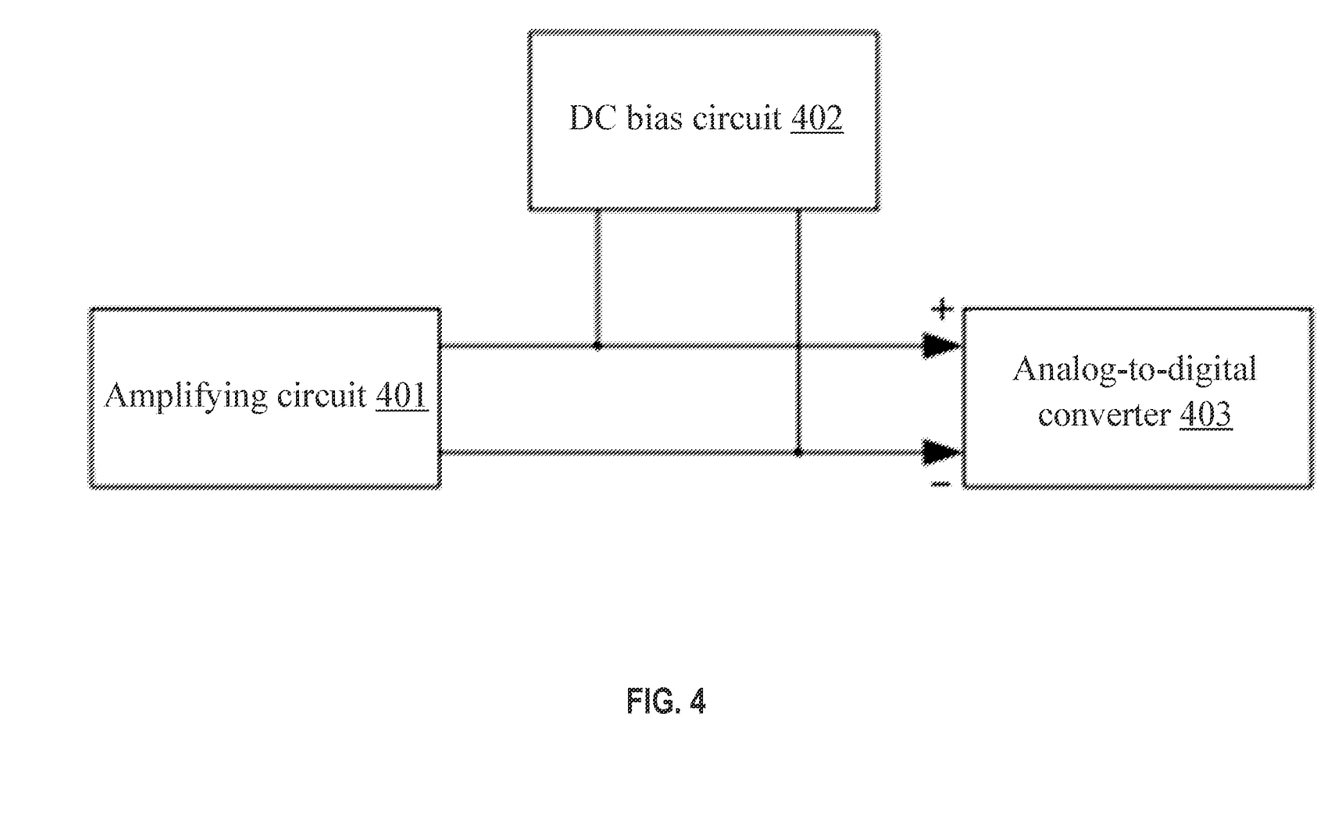
FIG. 4 is a block diagram of a laser receiving circuit according to an embodiment of the present application.

An embodiment of the present application provides a laser receiving circuit. As shown in FIG. 4, the laser receiving circuit in the embodiment of the present application includes an amplifying circuit 401, a DC bias circuit 402, and an analog-to-digital converter 403.

The amplifying circuit 401 is connected to the analog-to-digital converter 403 and configured to amplify input first voltage signals to obtain second voltage signals. The second voltage signals are AC voltage signals, and the first voltage signals can be voltage signals input by a TIA.

The DC bias circuit 402 is connected to the analog-to-digital converter 403 and configured to generate reverse DC voltage signals. A voltage value of the reverse DC voltage signals is a negative value; where the reverse DC voltage signals and the second voltage signals are superimposed to obtain third voltage signals.

The analog-to-digital converter 403 is configured to sample the third voltage signals. The digital signals generated after sampling can be sent to the controller for subsequent processing.

Figure 5:
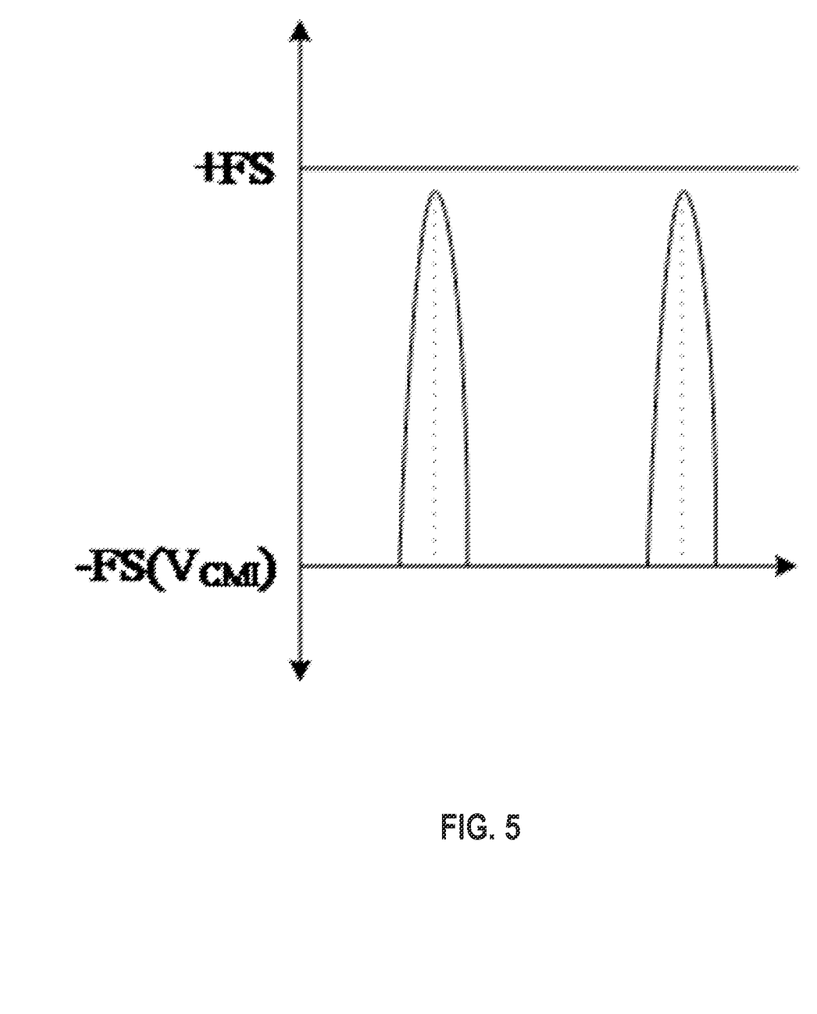
FIG. 5 is a schematic diagram of an actual input dynamic range of an analog-to-digital converter after reverse DC voltage signals are loaded according to an embodiment of the present application.

In this embodiment, the amplifying circuit 401, the DC bias circuit 402, and the analog-to-digital converter 403 are all dual-port circuits. A first output terminal of the amplifying circuit 401 is connected to a positive input terminal of the analog-to-digital converter 403. The second output terminal of the amplifying circuit 401 is connected to a negative input terminal of the analog-to-digital converter 403. A first output terminal of the DC bias circuit 402 is connected to the positive input terminal of the analog-to-digital converter 403. A second output terminal of the DC bias circuit 402 is connected to the negative input terminal of the analog-to-digital converter 403. It is assumed that a voltage range of the second voltage signals output by the amplifying circuit 401 is increased to 0~2Fs. A voltage value of the reverse DC voltage signals generated by the DC bias circuit 402 is –Fs. Since the second voltage signals are AC voltage signals, and the reverse DC voltage signals are DC voltage signals, the third voltage signals generated by superimposing the first voltage signals and the reverse DC voltage signals have a voltage range of –Fs~+Fs, that is, the analog-to-digital converter 403 has an actual input dynamic range of –Fs~+Fs as shown in FIG. 5. The input dynamic range of the analog-to-digital converter 403 is greatly improved compared to 0~Fs in the related art. An increase in the input dynamic range of the analog-to-digital converter 403 increases a signal-to-noise ratio of the laser receiving circuit accordingly, thereby improving a ranging performance.

Figure 6:
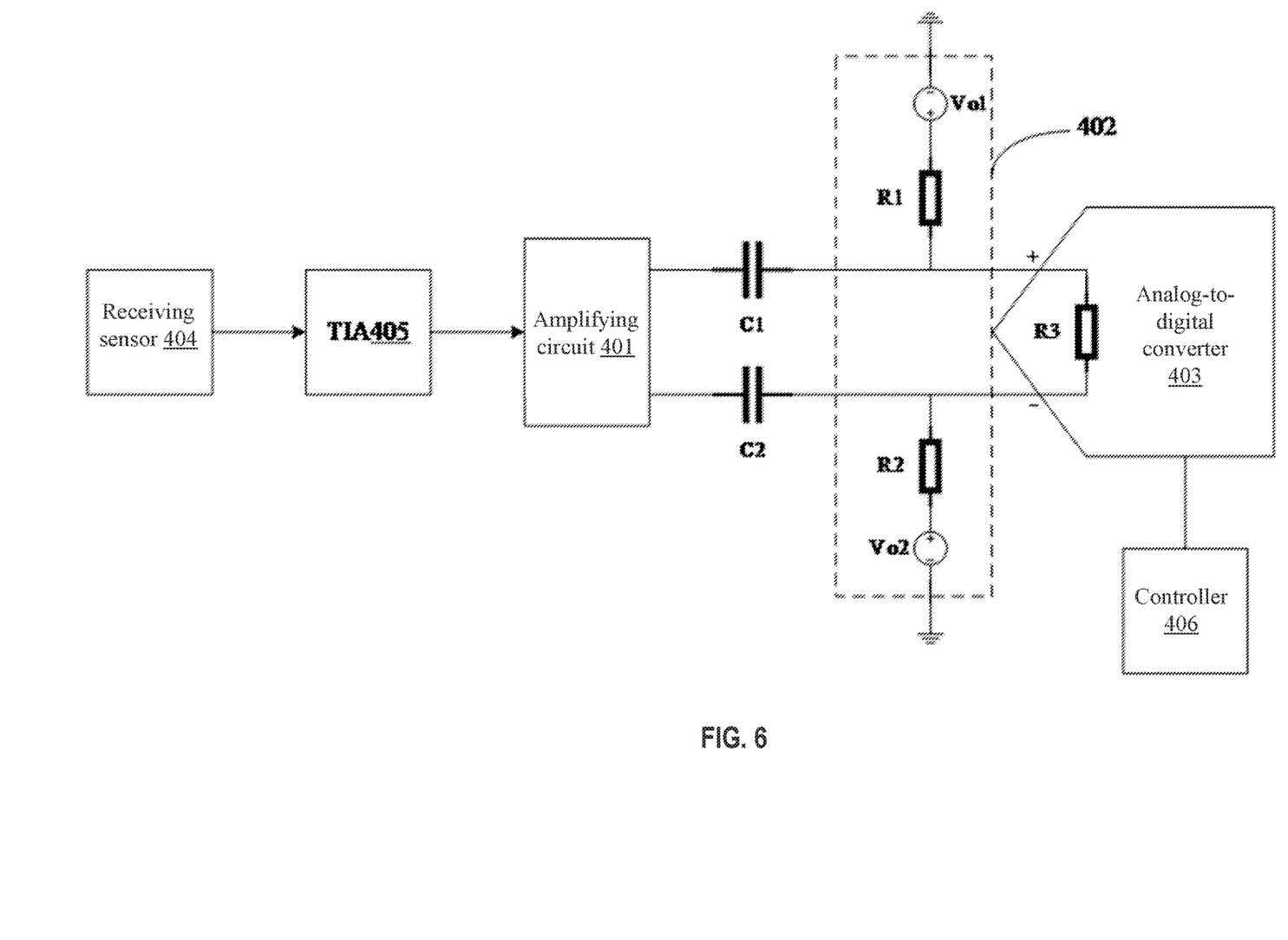
FIGS. 6 to 8 are yet another schematic structural diagrams of a laser transmitting circuit according to an embodiment of the present application.
Figure 7:
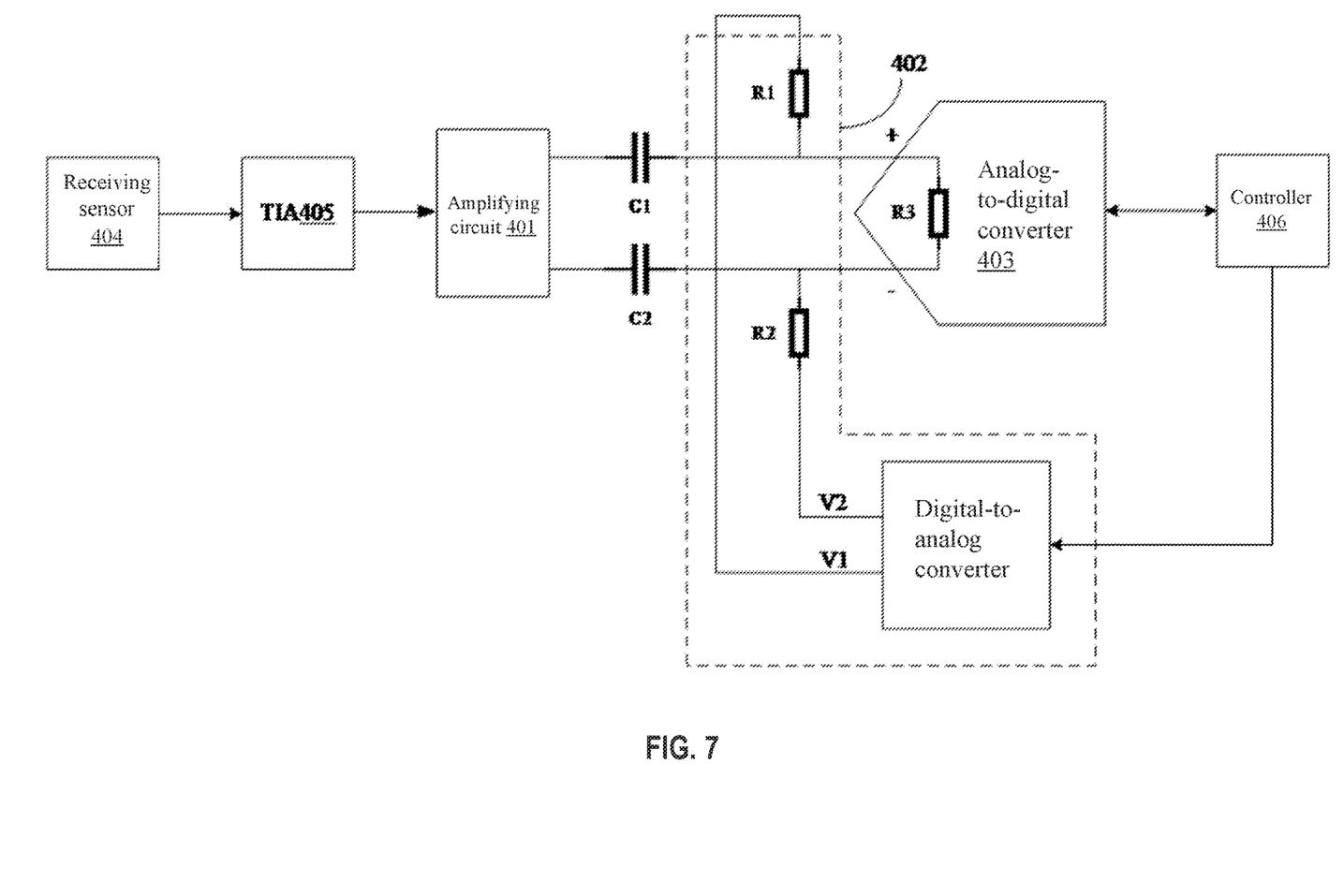
Figure 8:
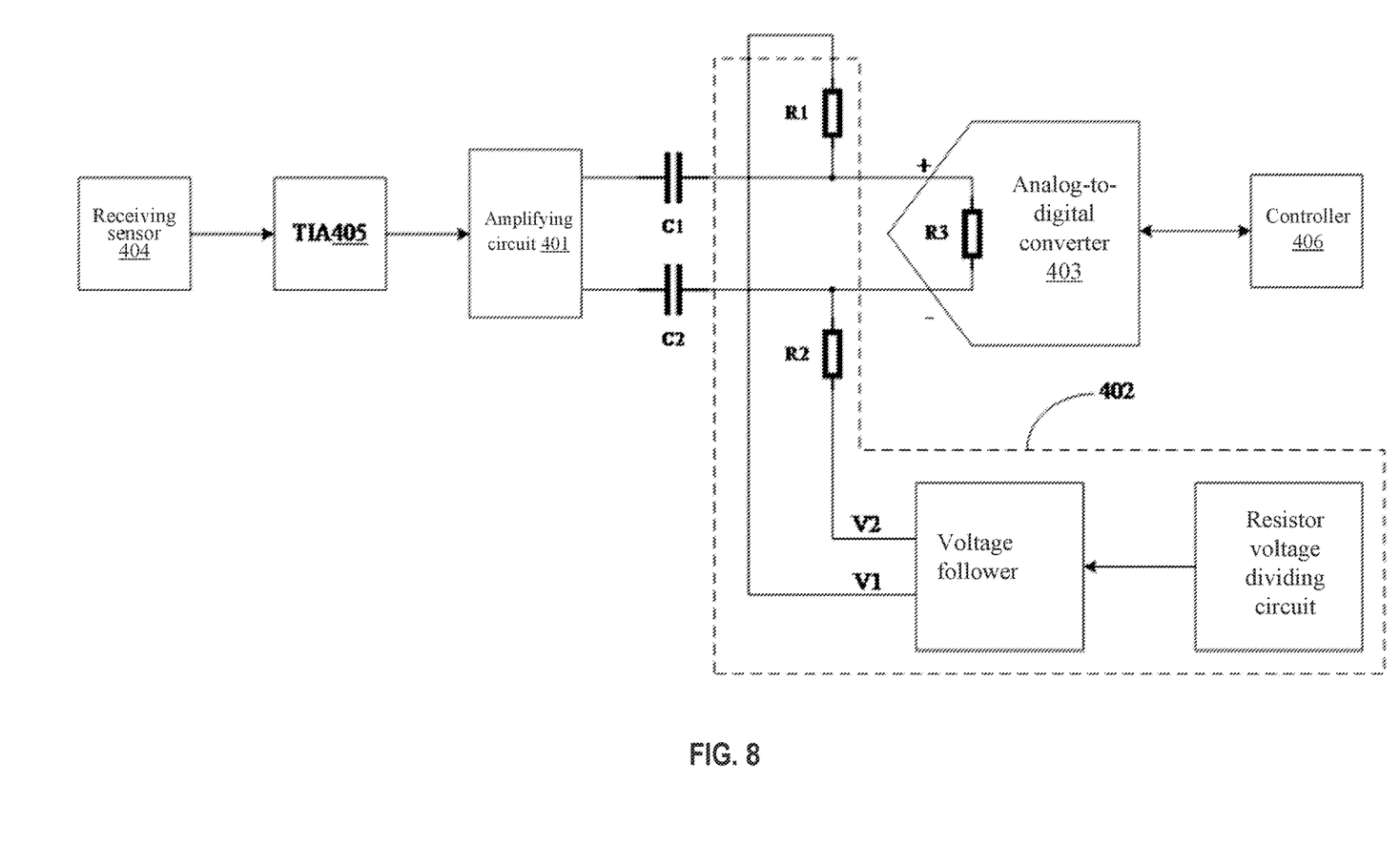

The present application describes a structure of the DC bias circuit 402 with reference to FIGS. 6 to 8.

FIG. 6 is another schematic structural diagram of a laser receiving circuit according to an embodiment of this application. The laser receiving circuit includes a receiving sensor 404, a TIA 405, an amplifying circuit 401, a DC bias circuit 402, an analog-to-digital converter 403, and a controller 406. The DC bias circuit 402 includes a first DC voltage source Vo1, a first resistor R1, a second DC voltage source Vo2, and a second resistor R2.

The receiving sensor 404 is connected to the TIA 405. The TIA 405 is connected to the amplifying circuit 401. The amplifying circuit 401 is provided with two output terminals: a first output terminal and a second output terminal. The analog-to-digital converter 403 is provided with two input terminals: a positive input terminal and a negative input terminal. The first output terminal of the amplifying circuit 401 is connected to the positive input terminal of the analog-to-digital converter 403. The second output terminal of the amplifying circuit 401 is connected to the negative input terminal of the analog-to-digital converter 403. A positive electrode of the first DC voltage source Vo1 is connected to the positive input terminal of the analog-to-digital converter 403 via the first resistor R1. A negative electrode of the first DC voltage source Vo1 is grounded. A positive electrode of the second DC voltage source Vo2 is connected to a negative input terminal of the analog-to-digital converter 403 via the second resistor R2. A negative electrode of the second DC voltage source Vo2 is grounded. The analog-to-digital converter 403 is internally or externally provided with a voltage dividing resistor R3. The voltage dividing resistor R3 is connected across the positive input terminal and the negative input terminal of the analog-to-digital converter 403. The first DC voltage source Vo1 has an output voltage value less than that of the second DC voltage source Vo2, thereby having an effect that a reverse DC voltage signal is loaded on the input port of the analog-to-digital converter 403.

In some embodiments, the laser receiving circuit further includes a first capacitor C1 and a second capacitor C1. The first output terminal of the amplifying circuit 401 is connected to the positive input terminal of the analog-to-digital converter 403 via the first capacitor C1. The second output terminal of the amplifying circuit 401 is connected to the negative input terminal of the analog-to-digital converter 403 via the second capacitor C2. Device parameter values of the first capacitor C1 and the second capacitor C2 are the same. The device parameter value includes a capacitance value. The first capacitor C1 and the second capacitor C2 are configured to isolate a DC component in the second voltage signals output by the amplifying circuit 401.

If the output voltage value of the first DC voltage source Vo1 is set to be V1, and the output voltage value of the second DC voltage source Vo2 is set to be V2, a voltage value loaded on an input port of the analog-to-digital converter 403 is a voltage value loaded on the voltage dividing resistor R3. The voltage value is:

$$V_{in} = V_{R3} = \frac{R3}{R1 + R2 + R3} \times (V1 - V2)$$

The output voltage value V1 of the first DC voltage source Vo1 is less than the output voltage value V2 of the second DC voltage source Vo2. According to the foregoing formula, the voltage value loaded on the input port of the analog-to-digital converter 403 can be a negative value. It can be seen that when the output voltage value of the amplifying circuit 401 is 0, the voltage value on the input port of the analog-to-digital converter 403 is a negative value. In some embodiments, the value of Vin can be determined based on the minimum value of the input dynamic range supported by the analog-to-digital converter 403. The voltage value on the input port of the analog-to-digital converter 403 is a negative value, that is, an input baseline of the analog-to-digital converter 403 is lowered, thereby increasing an input dynamic range of the analog-to-digital converter 403. For example, if the input dynamic range supported by the analog-to-digital converter 403 is –Fs~Fs, and the minimum value is –Fs, the voltage value loaded by the DC bias circuit 402 on the input port of the analog-to-digital converter 403 is −Fs. Correspondingly, the actual input dynamic range (0~2Fs) of the analog-to-digital converter 403 is equal to the input dynamic range of −Fs~Fs supported by the analog-to-digital converter 403.

FIG. 7 is a schematic structural diagram of a laser receiving circuit according to an embodiment of the present application. The laser receiving circuit in this embodiment is only distinct from the laser receiving circuit in FIG. 6 in that a structure of a DC bias circuit 402 is different. The DC bias circuit 402 of this embodiment includes a first resistor R1, a second resistor R2, and a digital-to-analog converter. The digital-to-analog converter is provided with two output terminals: a first output terminal and a second output terminal. The two output terminals can output DC voltage signals. The first output terminal of the digital-to-analog converter is connected to the positive input terminal of the analog-to-digital converter 403 via the first resistor R1. The second output terminal of the digital-to-analog converter is connected to the negative input terminal of the analog-to-digital converter 403 via the second resistor R2. A control terminal of the digital-to-analog converter is connected to the controller 406. The analog-to-digital converter 403 is internally or externally provided with a voltage dividing resistor R3. The voltage dividing resistor R3 is connected across the positive input terminal and the negative input terminal of the analog-to-digital converter 403.

A voltage value of DC voltage signals output by the first output terminal of the digital-to-analog converter is V1. A voltage value of DC voltage signals output by the second output terminal is V2, and V1<V2. The voltage value of reverse DC voltage signals loaded by an input port of the analog-to-digital converter 403 is shown in the formula of FIG. 6, which is not repeated here.

Referring to FIG. 8, FIG. 8 is a schematic structural diagram of a laser receiving circuit according to an embodiment of the present application. The laser receiving circuit in this embodiment is only distinct from the laser receiving circuit in FIG. 6 in that a structure of a DC bias circuit 402 is different. The DC bias circuit 402 in this embodiment includes a first resistor R1, a second resistor R2, a voltage follower, and a resistor voltage dividing circuit. The resistor voltage dividing circuit is connected to the voltage follower. The voltage follower is provided with two output terminals: a first output terminal and a second output terminal. The first output terminal is connected to a positive input terminal of an analog-to-digital converter 403 via the first resistor R1. The second output terminal is connected to the negative input terminal of the analog-to-digital converter 403 via the second resistor R2. The voltage follower has the following features: a high input resistor, a low output resistor, and a voltage gain of 1, that is, an input voltage value is equal to an output voltage value.

Figure 9:
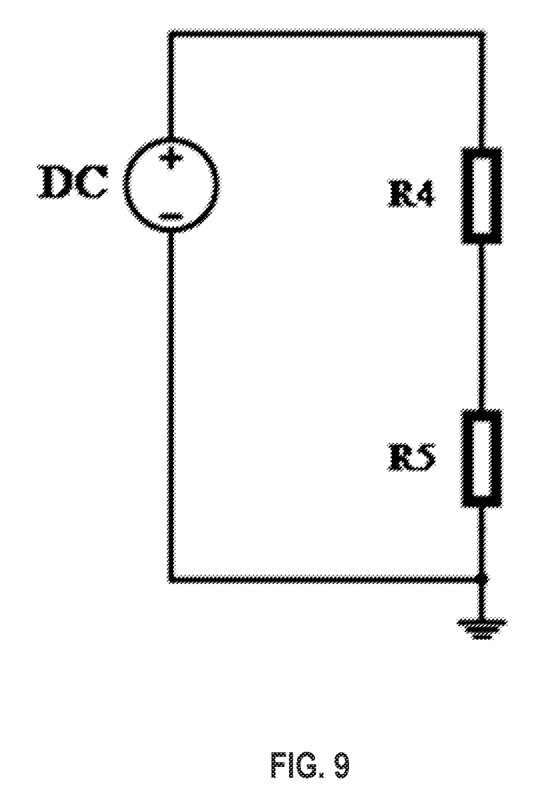
FIG. 9 is a schematic structural diagram of a resistor voltage division circuit according to an embodiment of the present application.

A voltage value of DC voltage signals output by the first output terminal is V1, and a voltage value of DC voltage signals output by the second output terminal is V2. The resistor voltage dividing circuit can output two DC voltage signals, and V1<V2. A voltage value of reverse DC voltage signals loaded by the input port of the analog-to-digital converter 403 is shown in the formula of FIG. 6, which is not repeated here. For example: referring to the resistor voltage dividing circuit described in FIG. 9, the resistor voltage dividing circuit includes a fourth resistor R4, a fifth resistor R5, and a DC voltage source DC. If an output voltage of the DC voltage source DC is V, the first output terminal of the voltage follower has a voltage value $V1=R5 \times V/(R4+R5)$. The voltage value on the second output terminal of the voltage follower is $V2=V$.

In an embodiment of the present application, the DC bias circuit is added to the laser receiving circuit. The DC bias circuit loads the reverse DC voltage signals on the input port of the analog-to-digital converter to move a baseline of input voltage signals of the analog-to-digital converter down, which can increase an input dynamic range of the analog-to-digital converter, and increase a gain of a previous-step amplifying circuit, thereby improving a signal-to-noise ratio of the laser receiving circuit and increasing a ranging performance.

An embodiment of the present application also provides a LiDAR, including the foregoing laser receiving circuit.

In some embodiments, the foregoing laser receiving circuit can be applied to the LiDAR. In addition to the laser receiving circuit, the LiDAR can also include specific structures such as a power supply, a processing device, an optical receiving apparatus, a rotating base, a housing, a human-computer interaction apparatus, or the like. It can be understood that the LiDAR can be a single-channel LiDAR, and includes one channel of the foregoing laser receiving circuit. The LiDAR can also be a multi-channel LiDAR, and includes a plurality of channels of the foregoing laser receiving circuits and a corresponding control system. The quantity of the laser receiving circuits can be determined according to actual needs.

For the LiDAR, a DC bias circuit is added to the laser receiving circuit. The DC bias circuit loads reverse DC voltage signals on an input port of an analog-to-digital converter to move a baseline of input voltage signals of the analog-to-digital converter down, which can increase an input dynamic range of the analog-to-digital converter, and increase the gain of the previous-step amplifying circuit, thereby improving a signal-to-noise ratio of the laser receiving circuit and enhancing a ranging performance.

The person skilled in the art can understand that all or part of procedures in methods of the foregoing embodiments can be implemented by instructing relevant hardware via a computer program. The program can be stored in a computer-readable storage medium. During execution, the computer program can include the procedures of the embodiments of the foregoing methods. The storage medium can be a magnetic disk, an optical disc, a read-only storage memory, a random storage memory, and so on.

The disclosed foregoing are only exemplary embodiments of this application, which cannot be used to limit the scope of rights of this application. Therefore, equivalent changes made in accordance with the claims of this application still fall within the scope of the application.

What is claimed is:

1. A laser receiving circuit, comprising:
   an amplifying circuit, connected to an analog-to-digital converter and configured to amplify input first voltage signals to obtain second voltage signals, wherein the second voltage signals are AC voltage signals;
   a DC bias circuit, connected to the analog-to-digital converter and configured to generate reverse DC voltage signals, wherein the reverse DC voltage signals and the second voltage signals are superimposed to obtain third voltage signals; and
   the analog-to-digital converter, configured to sample the third voltage signals.

2. The laser receiving circuit according to claim 1, wherein a voltage value of one of the reverse DC voltage signals is equal to a minimum value of an input dynamic range supported by the analog-to-digital converter.

3. The laser receiving circuit according to claim 1, wherein the DC bias circuit comprises a first resistor, a second resistor, a voltage dividing resistor, a first DC voltage source, and a second DC voltage source; the amplifying circuit is provided with a first output terminal and a second output terminal; and the analog-to-digital converter is provided with a positive input terminal and a negative input terminal, wherein
- a positive electrode of the first DC voltage source is connected to the positive input terminal of the analog-to-digital converter via the first resistor, and a negative electrode of the first DC voltage source is grounded;
- a positive electrode of the second DC voltage source is connected to a negative electrode of the analog-to-digital converter via the second resistor, and a negative electrode of the second DC voltage source is grounded; and
- the analog-to-digital converter is internally or externally provided with a voltage dividing resistor, the voltage dividing resistor is connected across the positive input terminal and the negative input terminal of the analog-to-digital converter.

4. The laser receiving circuit according to claim 1, further comprising a controller, wherein the DC bias circuit comprises:
- a first resistor, a second resistor, and a digital-to-analog converter, wherein the analog-to-digital converter is provided with a positive input terminal and a negative input terminal, and the digital-to-analog converter is provided with a first output terminal, a second output terminal, and a control terminal;
- wherein the first output terminal of the digital-to-analog converter is connected to the positive input terminal of the analog-to-digital converter via the first resistor, the second output terminal of the digital-to-analog converter is connected to the negative input terminal of the analog-to-digital converter via the second resistor, and the control terminal of the digital-to-analog converter is connected to the controller; and
- wherein the analog-to-digital converter is internally or externally provided with a voltage dividing resistor, and the voltage dividing resistor is connected across the positive input terminal and the negative input terminal of the analog-to-digital converter.

5. The laser receiving circuit according to claim 1, wherein the analog-to-digital converter is provided with a positive input terminal and a negative input terminal, and the DC bias circuit comprises:
- a first resistor, a second resistor, a voltage follower, and a resistor voltage dividing circuit, wherein
- the voltage follower is provided with a first output terminal and a second output terminal;
- the first output terminal of the voltage follower is connected to the positive input terminal of the analog-to-digital converter via the first resistor, and the second output terminal of the voltage follower is connected to the negative input terminal of the analog-to-digital converter via the second resistor, the voltage follower is connected to the resistor voltage dividing circuit and
- the analog-to-digital converter is internally or externally provided with a voltage dividing resistor, and the voltage dividing resistor is connected across the positive input terminal and the negative input terminal of the analog-to-digital converter.

6. The laser receiving circuit according to claim 5, wherein the resistor voltage dividing circuit comprises a DC voltage source, a fourth resistor, and a fifth resistor, wherein a voltage value of the first output terminal is a voltage value loaded on the fifth resistor, and a voltage value of the second output terminal is the voltage value of the DC voltage source.

7. The laser receiving circuit according to claim 3, wherein device parameter values of the first resistor, the second resistor, and the voltage dividing resistor are the same.

8. The laser receiving circuit according to claim 1, further comprising: a first capacitor and a second capacitor, wherein the amplifying circuit is connected to a positive input terminal of the analog-to-digital converter via the first capacitor, the amplifying circuit is connected to a negative input terminal of the analog-to-digital converter via the second capacitor.

9. The laser receiving circuit according to claim 8, wherein device parameter values of the first capacitor and the second capacitor are the same.

* * * * *